(No Model.)
2 Sheets—Sheet 1.

L. C. WALSH & R. T. TODD.
DEVICE FOR BRANDING CIGARS.

No. 573,730.  Patented Dec. 22, 1896.

Witnesses
James L. Smith
Wm. B. Thomas

Inventors
Lawrence C. Walsh,
Robert T. Todd.
By Harvey Spalding and Sons
Attorneys (No Model.) 2 Sheets—Sheet 2.

L. C. WALSH & R. T. TODD.
DEVICE FOR BRANDING CIGARS.

No. 573,730. Patented Dec. 22, 1896.

Witnesses
James S. Smith
W. B. Thomas

Inventors
Lawrence C. Walsh.
Robert T. Todd.
By Harry Spalding and Son,
Attorneys.

THE NORRIS PETERS CO., PHOTO-LITHO., WASHINGTON, D. C.

UNITED STATES PATENT OFFICE.

LAWRENCE C. WALSH AND ROBERT T. TODD, OF LAWRENCE, MASSACHUSETTS.

DEVICE FOR BRANDING CIGARS.

SPECIFICATION forming part of Letters Patent No. 573,730, dated December 22, 1896.

Application filed June 3, 1896. Serial No. 594,117. (No model.)

*To all whom it may concern:*

Be it known that we, LAWRENCE C. WALSH and ROBERT T. TODD, citizens of the United States, residing at Lawrence, in the county of Essex and State of Massachusetts, have invented certain new and useful Improvements in Devices for Branding Cigars, of which the following is a specification.

Our invention relates to devices for branding cigars, and has for its object the improvement of that class of branding-machines which impress or raise trade-marks, words, or symbols upon the exterior of cigars and similar articles by the combined effect of heat and pressure simultaneously applied.

Each constituent element of our invention is described in detail, and its office, together with the mode of operation of the whole, fully explained hereinafter.

Figure 1:
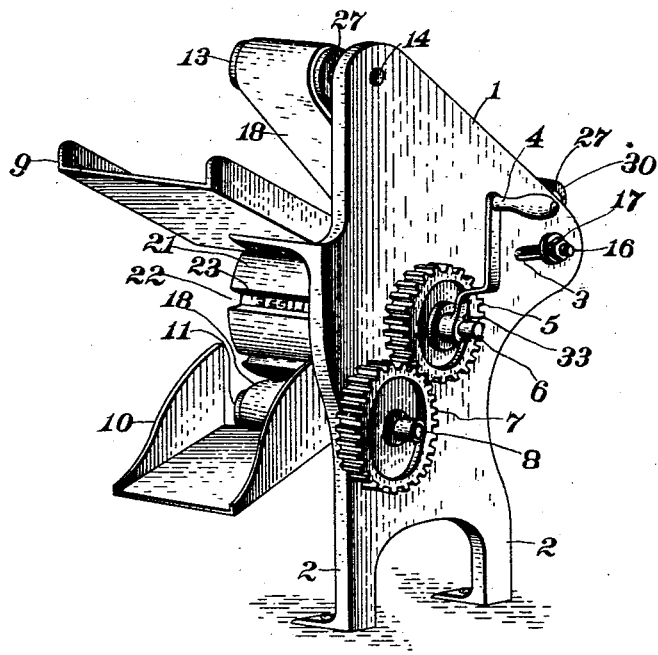
Figure 2:
Figure 3:
Figure 4:
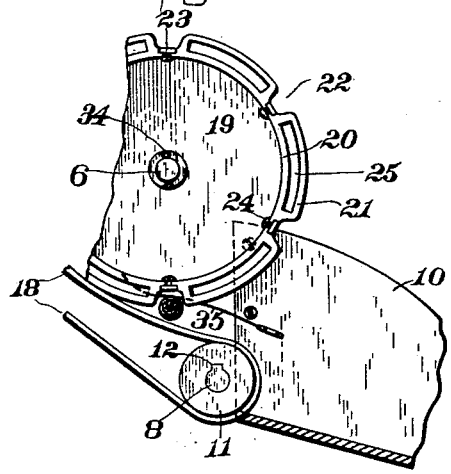
Figure 5:
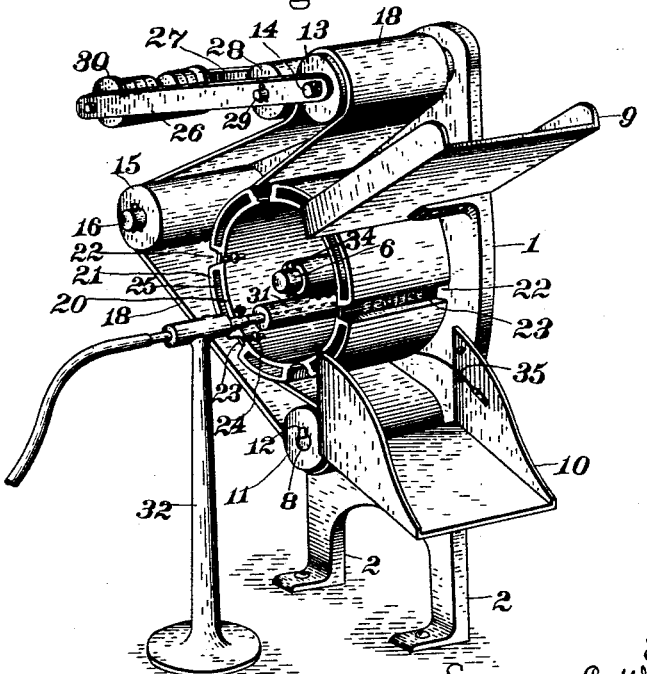

Referring to the accompanying drawings, wherein like numbers are employed to designate like parts throughout the several views, Figure 1 represents a perspective view of the main frame-plate and its attachments from the outside. Figs. 2 and 3 represent top and bottom plan views of the brand detached. Fig. 4 represents a side view of a portion of the drum and receiving-tray, showing the means provided for assisting the ejectment of cigars after branding; and Fig. 5 represents a perspective view of the inner side of main frame with attachments and source of heat.

Considering Fig. 1, numeral 1 designates the main frame-plate, having suitable supporting members 2 2, which may be constructed to rest upon a floor or table, and screw-holes can be formed through them by means of which the position of the frame could be fixed, if necessary.

3 marks a horizontal slot in the lower of the two upper corners of the frame, and will be mentioned again.

4 designates a crank of any convenient construction fixed radially upon one side of a gear-wheel 5, which in its turn is arranged to rotate loosely upon a shaft 6, fixed in and projecting upon both sides of the main frame-plate.

7 marks a second gear-wheel, usually similar in size to wheel 5.

8 designates a shaft revoluble within an orifice in the frame-plate, and upon the outer end of this shaft the gear-wheel 7 is fixed, its position enabling it to mesh with wheel 5, as shown.

Considering Fig. 5, numeral 9 designates the inclined tray employed to serve cigars to the branding mechanism, and 10 marks the tray placed to receive the cigars after they have been operated upon. At the lowest corner of the main frame-plate and upon the inner side a driving-pulley 11 is fixed upon the shaft 8 by key 12 or in some other chosen and effective manner, and it is from this pulley that the movable elements upon the inner side of main frame-plate derive their motion.

13 marks a pulley arranged to rotate upon a pin 14, which projects from the uppermost corner of the frame-plate, and 15 designates the third pulley. The third pulley rotates upon a pin 16, which is provided with a shoulder and a threaded extremity constructed to be passed through slot 3, above referred to, and wherein the pin may be fixed at any point by a nut 17. (See Fig. 1.)

18 marks a belt, fashioned of material selected to withstand the usage and heat combined. Between the lowest and upper pulleys 11 and 13 the branding-drum is placed. It is supported and may be revolved upon the fixed shaft 6, already described. The drum consists of a disk portion 19, having a suitable hub centrally located, an inner flange 20, an outer flange 21, and curved cigar-holders 22.

Any number of cigar-holders may be provided. Ordinarily their number is six, and the periphery of the drum is practically divided into six equal parts by grooves parallel with the axis, the grooves or cigar-holders reaching to the inner flange. At the bottom of each cigar-holder is fixed (see Figs. 2 and 3) a brand 23, customarily by a screw 24, passing into a threaded orifice in the bottom of the brand, through flange 20, from the inside.

It is clear that other equivalent means of fixing the brands within the holders may be used. It is commonly sufficient to provide each brand with a stiff spring arranged to pass upon the inside of and to clasp flange 20.

By constructing the drum as described the interval between flanges 20 and 21 is divided into air-spaces 25, that constitute a series of non-conducting chambers continuously interposed between belt 18 and source of heat. It is not, however, always necessary that the belt should be thus guarded, and we do not confine ourselves to the air-spaces, but may omit them in certain grades of machines.

26 and 27 designate two parallel bars pivotally attached to the pin 14. Bar 26 is placed outside the pulley 13, and the corresponding end of bar 27 lies between the pulley and the main frame-plate.

28 marks a roller held revoluble between bars 26 and 27 upon pin 29, and 30 designates a receptacle attached to the outer ends of the parallel bars to receive and retain weights.

Number 31 designates a gas-burner supported by a movable stand 32, both of ordinary construction and operation.

33 and 34 mark split pins passed through orifices near opposite ends of fixed shaft 6 to retain thereupon the gear 5 and branding-drum.

Number 35 designates a piece of spring-wire attached to the receiving-tray 10 and arranged near the flanges of the drum (see Fig. 4) for the purpose of ejecting such cigars as may stick within the holders. Wire 35 crosses the circle of inner flange 20 at the point where each holder leaves the belt, or at the point where drum and belt separate.

In assembling the parts of our invention the shaft 6 is fixed in position. Then gear 5 and crank are placed upon the outer surface of the main frame-plate. On the opposite side of the plate the drum is placed upon the shaft 6. Revoluble shaft 8 is then inserted in its bearing and gear-wheel 7 fixed thereupon in engagement with wheel 5. Upon the remaining end of shaft 8 the driving-pulley 11 is keyed. Trays 9 and 10 are either riveted or screwed at the proper incline to the main frame-plate. Pulley 15 is placed upon pin 16 and the threaded end of the pin passed through slot 3 and fastened by the nut 17. Pin 14 is passed through the orifice near one end of the bar 27, thence through the central orifice of pulley 13 and through the orifice near end of bar 26. The roller 28 and pin 29 are placed as shown in Fig. 5 and the receptacle for weights attached at the outer ends of the bars, as already stated. Should the belt 18 be constructed of one continuous piece of material, it must obviously be placed about pulley 13 before the outer bar is attached. If the belt is constructed in the more common form and laced together at the ends, it may be inserted between the bars and passed about the pulleys.

It will be noticed, Fig. 5, that the triangular arrangement of the pulleys brings one portion of the belt into close contact with the periphery or face of the drum for approximately one-half of the distance around it, and that each cigar is subjected to pressure and heat throughout that distance. As already explained, the pulley 15 is adjustable toward or from the drum, thus affording one point at which the tension of the belt may be varied. It is necessary, however, in certain cases to provide automatic regulation of tension for the belt.

All cigars, even with the greatest care, cannot be formed precisely the same in diameter, and in order that each one shall be carried by the drum under exactly the same conditions of heat and pressure the pivoted parallel bars, roller, and weights are brought into play. The bars act together as a lever with a weighted end and the roller 28 is kept in contact with the belt always by the same force, and, within the narrow limits of the variation of the diameters of the cigars, the pressure is maintained practically constant.

The heat may clearly be regulated in the well-known manner, and the burner is usually operated detached from the branding-machine proper, the distance of the burner and its support from the drum being varied as desired. As the movement of the belt continually revolves the drum, the heat is equalized throughout, each holder and brand receiving its due share.

The operation of our invention may be described as follows: Cigars are arranged side by side upon the serving-tray 9, which is attached to the main frame-plate at the proper angle. As each holder is presented at the edge of the tray a cigar falls into it and is borne around by the revolution of the drum, the brand impressing its characters upon the wrapper by the combined effect of the pressure from the belt and the softening action of the heat. Ordinarily the face of the drum, and consequently the length of each holder, is slightly less than that of the cigars operated upon. The projecting ends of the cigars are brought into contact with ejector-wire 35 at or near the point where belt and drum separate, and each cigar in turn is caused to fall upon the receiving-tray 10, which may be given a certain incline, as appears in Fig. 4, the cigars falling therefrom into any convenient receptacle.

Our machines may, within the scope of our invention, be constructed in form somewhat at a variance with the precise shapes of the parts as shown herein.

What we claim, and desire to protect by Letters Patent of the United States, is—

1. In a device for branding cigars, the combination of a main frame-plate, three pulleys triangularly placed and adapted for revoluble attachment to said plate, means for adjusting one of said pulleys toward or from a line joining the axes of the others, a drum constructed for revoluble attachment to said plate between two of said pulleys, said drum having grooves or cigar-holders at intervals across its face, brands constructed to be fixed within said cigar-holders, a belt, means for serving cigars to the cigar-holders of said drum, and mechanism for operating said belt, substantially as described.

2. In a device for branding cigars, the combination of a main frame-plate, three pulleys triangularly placed and adapted for revoluble attachment to said plate, means for adjusting one of said pulleys toward or from a line joining the axes of the others, a drum constructed for revoluble attachment to said plate between two of said pulleys, said drum having grooves or cigar-holders at intervals across its face, brands constructed to be fixed within said cigar-holders, a belt, means for serving cigars to the cigar-holders of said drum, mechanism for operating said belt, and an adjustable source of heat, substantially as described.

3. In a device for branding cigars, the combination of a main frame-plate, three pulleys triangularly placed and adapted for revoluble attachment to said plate, means for adjusting one of said pulleys toward or from a line joining the axes of the others, a drum constructed for revoluble attachment to said plate, said drum consisting of a disk portion possessing a central hub, an inner flange, an outer flange and cigar-holders or grooves extending between the outer and inner flanges whereby the interval between said flanges is divided into air-chambers, brands constructed to be fixed within the said cigar-holders, a belt, means for serving cigars to the cigar-holders of said drum, mechanism for operating said belt, and an adjustable source of heat, substantially as described.

4. In a device for branding cigars, the combination of a main frame-plate, three pulleys triangularly placed and adapted for revoluble attachment to said plate, means for adjusting one of said pulleys toward or from a line joining the axes of the others, a drum constructed for revoluble attachment to said plate, said drum consisting of a disk portion possessing a central hub, an inner flange, an outer flange and cigar-holders or grooves extending between outer and inner flanges whereby the interval between said flanges is divided into air-chambers, brands constructed to be fixed within the cigar-holders of said drum, a belt, devices adapted to bear upon said belt and to maintain constant the pressure contact between belt and drum, means for serving cigars to the cigar-holders of said drum, mechanism for operating said belt, and an adjustable source of heat, substantially as described.

5. In a device for branding cigars, the combination of a main frame-plate, three pulleys triangularly placed and adapted for revoluble attachment to said plate, means for adjusting one of said pulleys toward or from a line joining the axes of the others, a drum constructed for revoluble attachment to said plate, said drum consisting of a disk portion possessing a central hub, an inner flange, an outer flange and cigar-holders or grooves extending between outer and inner flanges whereby the interval between said flanges is divided into air-chambers, brands constructed to be fixed within the cigar-holders of said drum, a belt, a lever comprising two side bars formed for pivotal connection with said plate, a revoluble roller adapted for arrangement between said side bars and a receptacle to receive and retain weights, said receptacle constructed for attachment to the outer ends of said side bars, means for serving cigars to the cigar-holders of said drum, mechanism for operating said belt, and an adjustable source of heat, substantially as described.

6. In a device for branding cigars, the combination of a main frame-plate, three pulleys triangularly placed and adapted for revoluble attachment to said plate, means for adjusting one of said pulleys toward or from a line joining the axes of the others, a drum constructed for revoluble attachment to said plate, said drum consisting of a disk portion possessing a central hub, an inner flange, an outer flange and cigar-holders or grooves extending between outer and inner flanges whereby the interval between said flanges is divided into air-chambers, brands constructed to be fixed within the cigar-holders of said drum, a belt, a lever comprising two side bars formed for pivotal connection with said plate, a revoluble roller adapted for arrangement between said side bars and a receptacle to receive and retain weights, said receptacle constructed for attachment to the outer ends of said side bars, means for serving cigars to the cigar-holders of said drum, mechanism for operating said belt, a receiving-tray suitably attached to said frame-plate, an ejector-wire, and an adjustable source of heat, substantially as described.

In witness whereof we hereunto set our hands in the presence of two witnesses.

LAWRENCE C. WALSH.
ROBERT T. TODD.

Witnesses:
ALBERT A. SCHAAKE,
NEWTON P. FRYE.